Patented Jan. 9, 1923.

1,441,981

UNITED STATES PATENT OFFICE.

ARTHUR HEINEMANN, OF BERLIN-TEMPELHOF, GERMANY.

PRODUCTION OF ARTIFICIAL RESINS.

No Drawing.   Application filed August 23, 1921.   Serial No. 494,713.

*To all whom it may concern:*

Be it known that I, ARTHUR HEINEMANN, subject or citizen of the German Republic, residing at Berlin-Tempelhof, Dorfstrasse 23, have invented certain new and useful Improvements in or Relating to the Production of Artificial Resins (for which I have made application in Germany March 4 1919), of which the following is a specification.

Resinous bodies manufactured from phenols and formaldehyde or para-formaldehyde, whether the condensation is performed by an acid, alkaline or neutral process, have certain disadvantages as compared with natural resins, chiefly because of instability of colour and greater brittleness. Another disadvantage of such bodies, especially if they have been condensed by means of an alkali, is that under the influence of temperature, air, light and time, they are liable to form insoluble compounds.

According to the present invention the physical and chemical properties of these resins are stabilized by adding to the finished product, after complete elimination of water, suitable quantities of alkaline gylcerates, for example sodium glycerate:—By this means the resin acquires a bright, constant colour, loses a large part of its brittleness, and becomes tougher, so that when used, for example, as a varnish, it may be bent without cracking. By the addition of a larger quantity sodium glycerate the melting point may be raised, and the solubility reduced or destroyed.

For the purpose of the process the phenol-formaldehyde resin free from water, is melted, and the requisite quantity of well dried sodium glycerate is added in a pulverulent state and stirred until it is fully incorporated and a homogeneous mass is obtained.

According to whether the resin is to be more or less soluble, and more or less soft, proportions of from 1 to 2% of sodium glycerate may be used; larger proportions of sodium glycerate gradually induce an insoluble condition of the resin, in which however, it can still be melted.

German Patent No. 222543 describes the use of glycerine together with acid or acid-yielding substances for accelerating the hardening of the condensation products. This was solely a disclosure of the acceleration of the hardening by addition of glycerine together with acid or substances producing acid reaction. The present invention consists in the use of an alkaline glycerate, without acid and not capable of being used together with acid. The addition is solid, whereas glycerine is liquid. A clear, bright resin is obtained, much lighter in color than that produced with glycerine, and its color is constant. Moreover the advantage is obtained that according to the proportion used, which is considerably smaller than that of glycerine, the brittleness is reduced and the toughness increased, or with a larger proportion of the alkaline glycerate the melting point is raised and the solubility in solvents reduced or wholly destroyed.

Having now particularly described and ascertained the nature of my said invention and in what manner the same is to be performed, I declare that what I claim is:—

The process of treating artificial resins obtained from phenols and formaldehyde which consists in adding alkaline glycerate to the product of condensation after the elimination of water therefrom.

In testimony whereof I have hereunto set my hand.

ARTHUR HEINEMANN.